Aug. 16, 1938.  L. J. KOCH  2,127,222
INTERNAL COMBUSTION POWER UNIT
Filed May 14, 1937   4 Sheets-Sheet 1
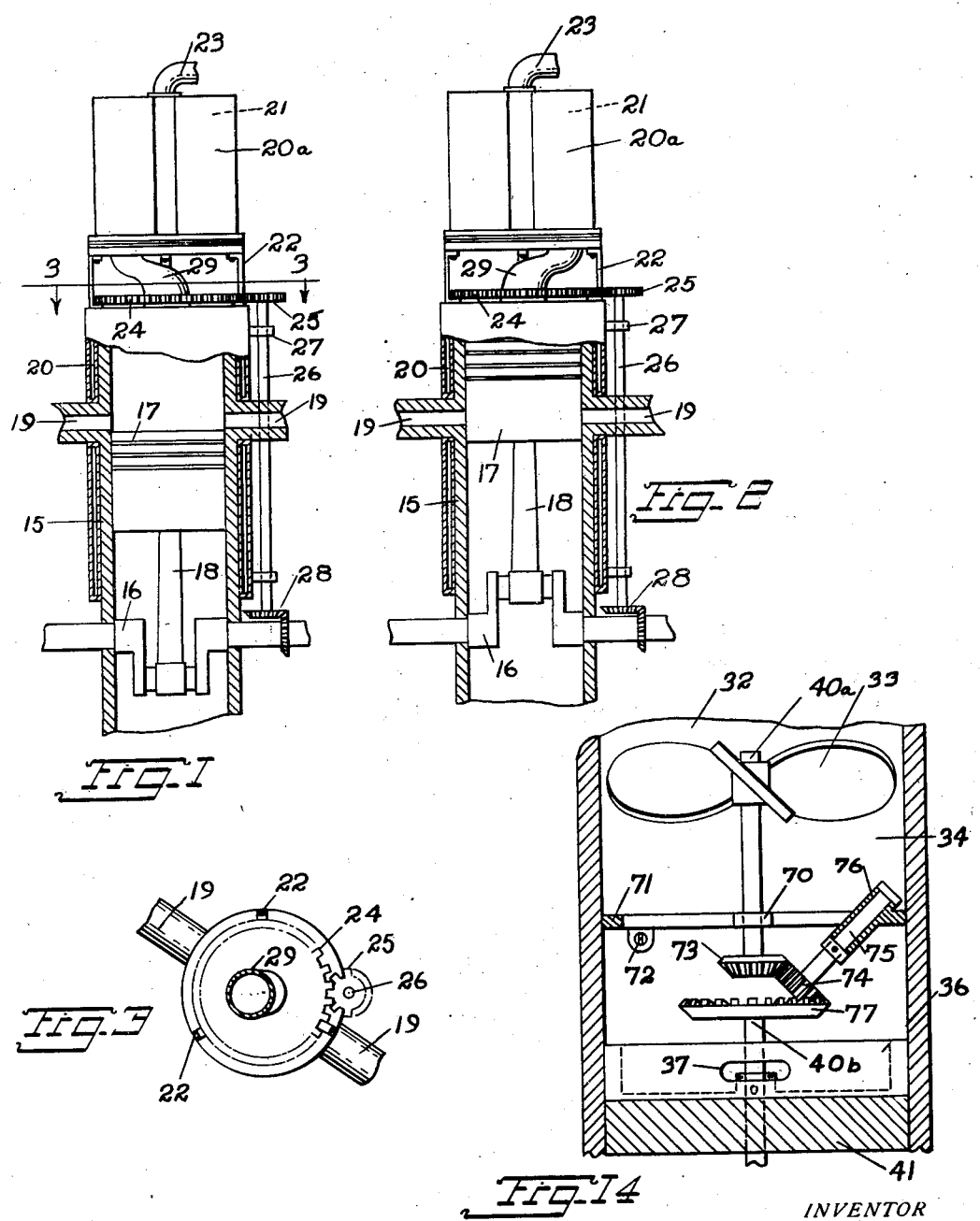
INVENTOR
LYNN J. KOCH
BY
ATTORNEY Aug. 16, 1938.  L. J. KOCH  2,127,222
INTERNAL COMBUSTION POWER UNIT
Filed May 14, 1937   4 Sheets-Sheet 2

INVENTOR
LYNN J. KOCH
BY
ATTORNEY

Aug. 16, 1938.  L. J. KOCH  2,127,222
INTERNAL COMBUSTION POWER UNIT
Filed May 14, 1937   4 Sheets-Sheet 3
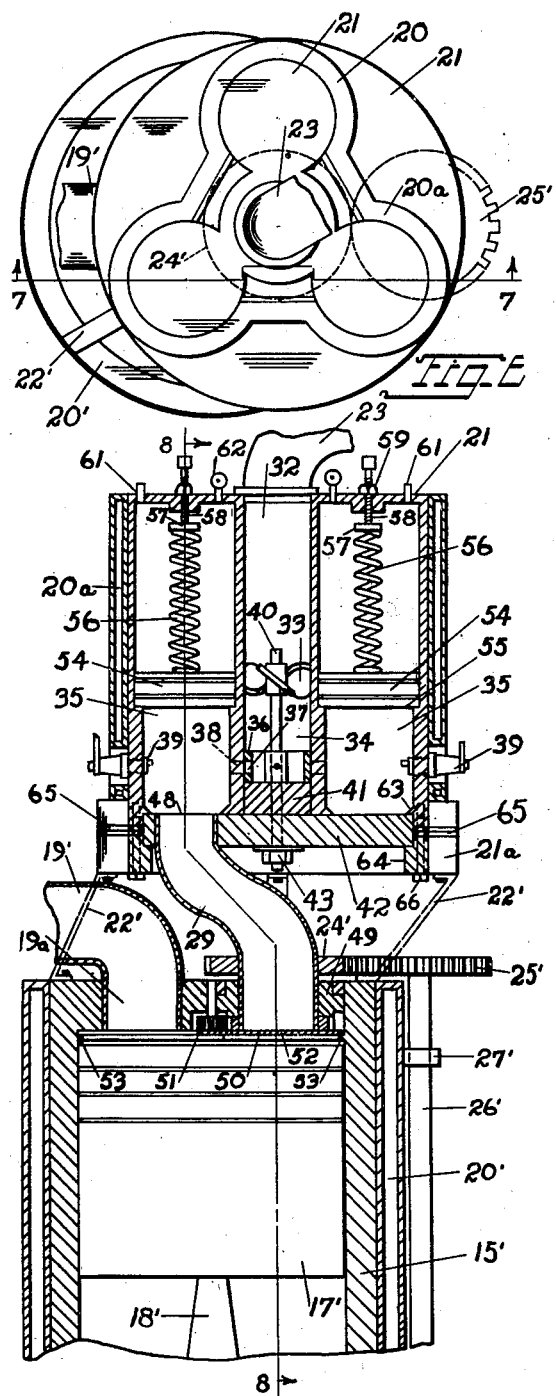
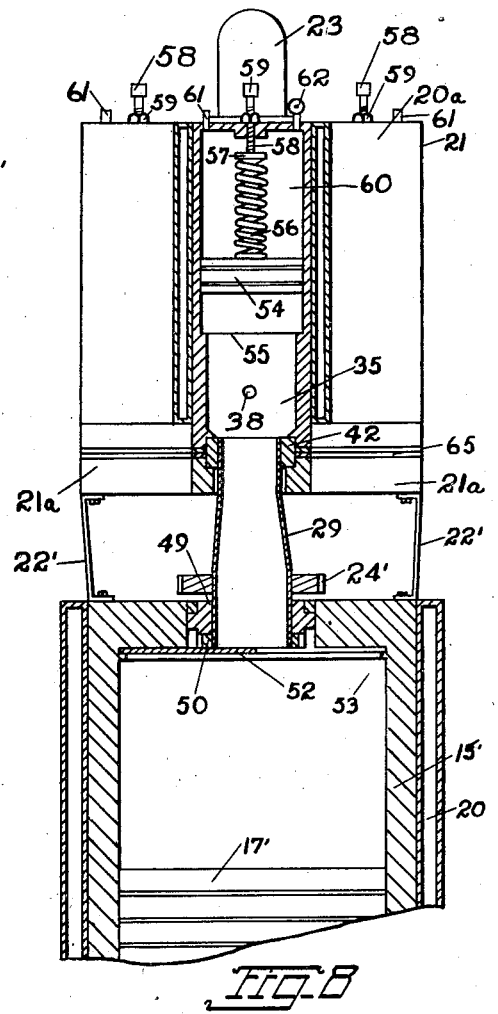
INVENTOR
LYNN J. KOCH
BY
ATTORNEY

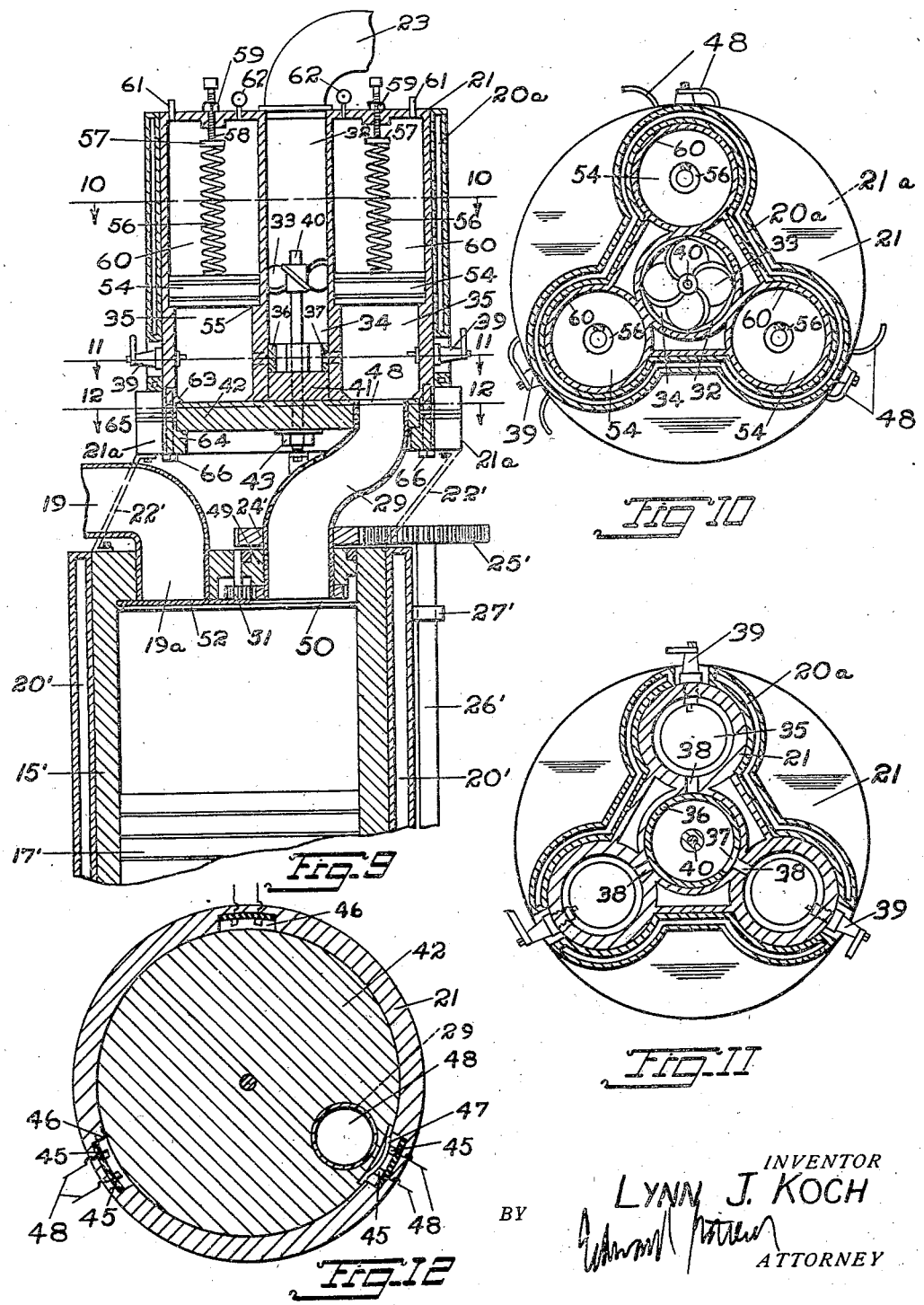

Patented Aug. 16, 1938

2,127,222

UNITED STATES PATENT OFFICE 2,127,222

INTERNAL COMBUSTION POWER UNIT

Lynn J. Koch, Allentown, Pa.

Application May 14, 1937, Serial No. 142,814

6 Claims. (Cl. 123—1)

This invention relates to new and useful improvements in an internal combustion power unit particularly devised for the purpose of creating and increasing the power of engines, of particular piston displacements, above their present abilities.

The invention has for an object the construction of a device as mentioned which will increase the efficiency of engines to which it is applied.

Further, it is proposed to so construct the device that its operation is economical, particularly because of the use of premature explosions arranged in a particular manner to operate the engine.

It is proposed to so arrange the unit that it may be used in conjunction with various types of engines, both stationary or of the locomotive type, and others constructed according to a great variety of different operations and principles—either water cooled, air cooled, or otherwise cooled and operated.

Specifically, the invention contemplates the construction of an internal combustion power unit and power booster which is characterized by a cluster of explosion chambers surrounding a packing or compression chamber and operated in a particular fashion. It is proposed that an induction chamber be provided for the collection of a quantity of ignitable gaseous substance from a carburetor or other source, and from which the gaseous substance is packed or compressed into a packing or compression chamber in a particular manner. It is also contemplated that a means be provided for controlling the flow or passage of said gas mixture in pre-determined sequence from said packing or compression chamber to said cluster of explosion chambers. It is proposed that a means be provided for prematurely igniting the gases in the explosion chambers in a predetermined cycle and for connecting in sequence said explosion chambers with the cylinder of an engine and synchronized with the running of the engine to deliver a power stroke for each downward motion of the piston of said cylinder.

With the arrangement specified in the previous paragraph it is possible to materially increase the number of revolutions of an engine, to strengthen the cycle power and stroke of the engine, and to greatly reduce the heat in the main cylinder of the engine. With the arrangement of the cluster of explosion chambers it is possible by systematical control to rotate the explosions in these explosion chambers and so divide and thus reduce the heat to which each chamber is subjected. It is proposed to convey the power of the ignited gases to the main cylinder of the engine at lower temperatures than heretofore without interfering or reducing the power.

It is proposed to provide an arrangement by which the gases in the cluster of explosion chambers are fired and delivered into the cylinder of the engine at the moment of greatest force upon the piston, making all down expanding strokes a power stroke and thus converting the usual four-cycle movement of an engine to a stronger two-cycle engine with a quickened revolution thereof and a tendency for greater delivery of power.

It is proposed to adapt the power unit so that similar units may be applied to each of the cylinders of an engine irrespective of the type or design of the engine, and applicable to two-cycle engines, four-cycle engines, etc., engines of the radial cylinder formation, the V-type cylinder formation, or the straight row formation, and others.

A further object of this invention resides in the provision of a means associated with each explosion chamber of the cluster of explosion chambers of each power unit for cushioning the shock of explosion and thereafter acting as an ejector for the ignited gases. It is proposed to provide a resiliently supported piston for this purpose to act as a buffer to counter-act the expansion of the ignited gases and to first recede under the impact of the explosion and then to advance and act as a pusher and assist and accelerate the rapidly expanding gases and act to give a weighty thrust on the piston of the cylinder of the engine to which the unit is attached and so exert and provide additional power without any greater consumption of fuel.

It is a further object of this invention to provide a disc, rotative or movably mounted across the bottom ends of the cluster of explosion chambers to form bases for these chambers. It is proposed to provide this disc with a port hole for the escape of the gases from the chambers. It is proposed to associate a conveying tube with the port hole, of a particular design and shape for efficient action, and it is proposed to so arrange the conveying tube that it will direct the discharge of the gases upon the top of the piston of a cylinder of an engine to which the unit is associated.

Furthermore, the invention contemplates the use of a shutter operating in conjunction with the disc mentioned in the previous paragraph and arranged to be used in place of the valves of the engine for opening and closing the ports to each cylinder to allow for the intake and exhaust of gases, and it is proposed that this shutter be fitted with a gear for its proper timing and synchronization with the operation of the other parts of the power unit.

A further advantage gained by using a power unit according to this invention resides in the fact that the stroke of the piston in the cylinder of an engine may be increased since the necessity of a compression chamber above the piston has been eliminated. It is possible for the piston to move completely to the end of the cylinder requiring but a very small space in contrast with the comparatively large compression chamber heretofore required.

With these ends in view and others which will become clear as this specification proceeds, this invention consists in the details of construction and combination of the elements hereinafter more specifically set forth, and particularly designated by the claims. In order that those skilled in the art to which this invention appertains may understand how to make and use the same, the construction of one or more forms of the invention will be made in details, referring to the numerals accompanying the drawings, forming a part of this specification, in which:

Fig. 1 is a partly elevational view of the power unit applied to a two-cycle engine, certain of the parts in the foreground being broken away to disclose interior parts.

Fig. 2 is a view similar to that shown in Fig. 1 with the piston shown in its top position.

Fig. 3 is a horizontal sectional view taken on the line 3—3 of Fig. 1.

Fig. 6 is an enlarged detailed plan view of Fig. 4.

Fig. 7 is a sectional view taken on the line 7—7 of Fig. 6.

Fig. 8 is a sectional view taken on the line 8—8 of Fig. 7.

Fig. 9 is a view similar to Fig. 8 but showing the parts when the piston is in its down position.

Fig. 10 is a horizontal sectional view taken on the line 10—10 of Fig. 9.

Fig. 11 is a horizontal sectional view taken on the line 11—11 of Fig. 9.

Fig. 12 is a horizontal sectional view taken on the line 12—12 of Fig. 9.

Fig. 14 is a fragmentary enlarged sectional view of a portion of a modified form of power unit constructed according to a modification of the invention. This portion particularly relates to the mechanism used for packing or compressing the gas mixture from the induction chamber to the packing or compression chamber.

Figure 4:
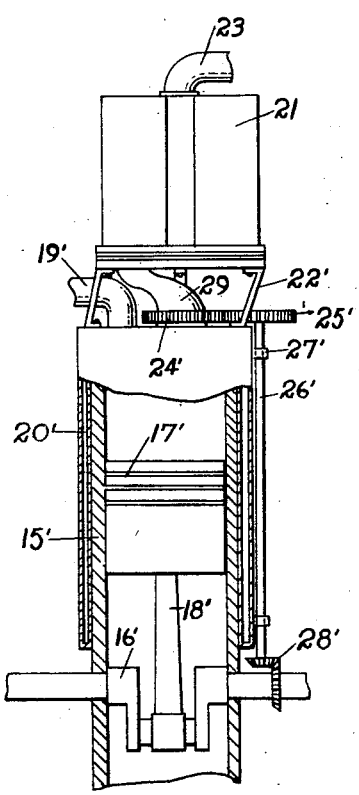
Fig. 4 is another view similar to Fig. 1 but illustrating the power unit applied to a four-cycle engine.

In Figs. 1 to 3 one of the cylinders of a two-cycle engine has been disclosed equipped with a power unit according to this invention. This two-cycle engine comprises a cylinder 15 which is provided with a crank shaft 16, and in which a piston 17 is mounted. A connecting rod 18 connects the piston with the crank shaft. Intermediate of the stroke of the piston 17 there are the usual exhaust ports 19. The other details of the two-cycle engine and its operation will not be given in this specification as it forms no part of the invention and would be understood by those skilled in the art. At this point it may be mentioned that the cylinder 15 is provided with a water cooling jacket 20, though this is not intended as a limitation since other cooling systems may be used without interfering with the operation of the power unit.

The power unit, according to this invention, is mounted on the top of the cylinder 15. It includes a body 21 which is supported by several braces 22 above the end of the cylinder 15. There is an inlet connection 23 to the body 21 through which a gas mixture from a carburetor or other similar unit may be connected. The details of the carburetor or other unit will not be disclosed nor further discussed in this specification since it forms no part of the invention. Interposed between the body 21 and the top of the cylinder 15 there is a rotary passageway tube 29 connected in a particular manner between the body 21 and the cylinder 15 as hereinafter more specifically described. This tube 29 is driven by a gear 24 mounted coaxially upon its lower end portion. This gear 24 meshes with a pinion 25 on a shaft 26 rotatively supported in bearings 27 and associated with bevel gears 28 connected with the crank shaft 16. This drive constitutes the means for synchronizing the power unit with the engine as more particularly set forth hereafter.

In Fig. 2 the piston 17 is illustrated in its top position. Attention is called to the fact that the passageway tube 29 is also in a moved position.

Figure 5:
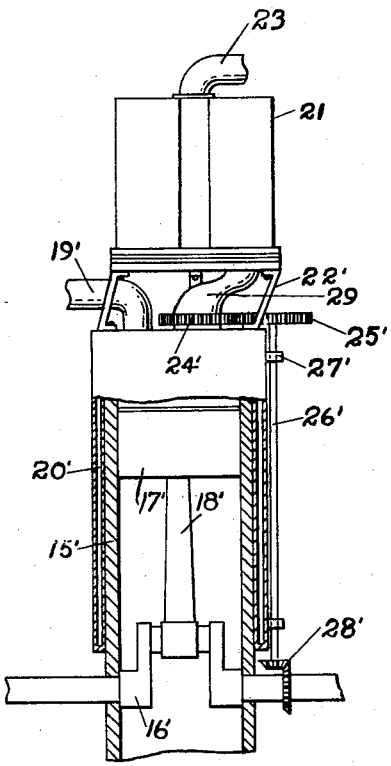
Fig. 5 is a view similar to Fig. 4 illustrating the condition of the parts when the piston of the cylinder of the engine is in its top position.

In Figs. 4 and 5 the identical power unit is shown associated with a four-cycle engine. With the power unit, this four-cycle engine will be converted so that there will be a power stroke for each movement of the piston downwards.

This four-cycle engine includes a cylinder 15' with which a crank shaft 16' is associated. Within the cylinder there is the piston 17' connected with the crank shaft by the connecting rod 18'. The exhaust for the engine is arranged at the top of the cylinder and the exhaust pipe is indicated by reference numeral 19'. The cylinder 15' is provided for the water cooling jacket 20'. The details of operation of the four-cycle engine will not be given in this specification since it forms no part of the invention and would be readily known to those skilled in the art.

A power unit, according to this invention is applied to the four-cycle engine and includes the body 21 supported by braces 22' upon the top of the cylinder 15'. There is an inlet 23 for a gas mixture from a carburetor or the like. A passageway tube 29 is associated with the body 21 and with the top of the cylinder 15' as hereinafter more fully described. A drive system is provided for synchronizing the power unit with the engine and includes a gear 24' mounted upon the lower end portion of the passageway tube 29 and meshing with a gear 25' upon a shaft 26' rotatively supported in bearings 27'. A pair of connected bevel gears 28' are arranged upon the gear shaft 16' and the shaft 26' respectively. Fig. 5 shows the piston 17' in its top position and shows the passageway tube 29 in a different position.

Figs. 6 to 13 inclusive illustrate details of the power unit so that the invention may be readily understood. The unit is shown applied to the four-cycle engine shown in Figs. 4 and 5. Within the body 21 there is an induction chamber 32 for cooling a quantity of ignitable gas mixture from the pipe 23, which goes to a carburetor or other similar device. A fan blade 33 is located transversely across the bottom of the induction chamber 32 (a theoretical bottom) and divides off a packing or compression chamber 34 directly below the induction chamber 32. A means is provided for packing or compressing a gas mixture in the induction chamber 32, into the chamber 34, and this means includes the fan 33. A cluster of explosion chambers 35 surround the packing and compression chamber 34. There is a means for controlling the flow of the gas mixture in pre-determined sequence from the packing and compression chamber 34 to the cluster of explosion chambers 35. This means includes a cup 36 with a port opening 37 alignable with port openings 38 communicating with the chambers 35.

A means is provided for prematurely igniting the gases in the combustion chambers in a pre-determined sequence and this means includes the spark plugs 39. There is also a means for connecting in sequence the said explosion chambers with the cylinder 15', in sequence, and synchronized with the running of the engine to deliver a power stroke with each downward motion of the piston 17' of the said cylinder 15'. This means includes the passageway tube 29.

The induction chamber 32 and the packing and compression chamber 34 are located at the center of the cluster of explosion chambers 35. These latter chambers are arranged around the former chambers. As illustrated on the drawings there are three explosion chambers in the cluster, though this is merely by way of illustration since any number may be used. The fan 33 is mounted upon a shaft 40 which extends through a disc 41 located below the cup 36. The shaft 40 also extends through a larger disc 42 which extends across the bottoms of the explosion chambers 35 and forms the bottoms for these chambers. A nut 43 serves to fixedly connect the shaft 40 upon the disc 42. The disc and shaft are arranged coaxially. The cup 36 is fixed on the shaft 40 to rotate with the shaft. The walls of the cup 36 are in intimate contact with the inner wall of the chamber 34, and a rotating fit therein. The port 37 is in the wall of the cup and is selectively alignable with the ports 38 which extend through the wall of the chamber 34 and the explosion chambers 35. The arrangement is such that as the cup rotates there will be periods in which the port 37 aligns in succession with the different ports 38 and the compressed and packed gas mixture will flow from the packing and compression chamber 34 to the explosion chambers.

Each of the spark plugs 39 is of standard design, and are intended to be connected in an ignition circuit not illustrated on the drawings, since such circuit forms no part of the invention. Each spark plug is controlled by a switch which is mounted adjacent the periphery of the disc 42 and upon the body 21. Each switch comprises, essentially, a pair of insulated contacts 45 which are mounted within a cavity 46 in the wall of the body 21 immediately adjacent the periphery of the disc 42. On the disc 42 there is a wiper spring contact 47 which is adapted to extend into the cavity 46 as the disc 42 turns and connect the pair of contacts 45. The contacts 45 are connected in a circuit 48 controlling the spark plugs. The arrangement is such that one pair of contacts 45 controls the operation of one of the spark plugs 39 and the parts are synchronized so that the spark plug 39 in the explosion cylinder 35 which is connected with the top of the cylinder 15', as hereinafter more fully described, operates at the proper moment. The details of the circuit 48 will not be given in this specification since it forms no part of the invention and any one familiar with electrical circuits in internal combustion engines would readily understand its construction and arrangement.

The means for connecting in sequence the explosion chambers 35 with the cylinder 15' and synchronized with the running of the engine to deliver a power stroke for each downward motion of the piston 17' and which includes the passageway tube 29, is constructed and operates as follows:

The disc 42 is formed with a port opening 48 eccentrically thereof and at a location to align with the bottom ends of the explosion chambers 35 as the disc 42 rotates. The passageway tube 29 has its upper end engaged into the port 48. The passageway 29 is of double elbow shape, that is, substantially like the letter S, and has its inside profile of substantially frusto-conical shape so that the gases may expand slightly during their travel from the explosion chamber to the cylinder 15'. The lower end of the passageway tube 29 extends through a disc 49 which is rotatively supported in the top end of the cylinder 15'. Thus, the passageway tube 29 may discharge into the top of the cylinder.

Upon an outer portion of the tube 29 there is mounted the said gear 24' which meshes with the said gear 25', and hence the other driving parts which connect it with the crank shaft of the engine as already described. The inner end of the passageway tube 29 is also provided with a gear, the gear 50. This gear meshes with a pinion 51 fixedly mounted on a shutter 52. The pinion 51 is coaxially rotatively supported in the top of the cylinder 15'. The shutter 52 is capable of extending across the open inner end of the passageway tube 29 to close the tube. It is also capable of rotating about the axis of the gear 51 and assume a position extended across the exhaust portion 19a at the top of the cylinder 15' which connects with the exhaust pipe 19'.

The shutter 52 works against an internal flange or seat 53 formed within the cylinder 15' near the very top thereof. This shutter 52 acts as a valve for the engine. There will be no need of re-grinding this valve since its very operation keeps re-grinding it continuously.

The means previously referred to for cushioning the shock of the explosion in each of the explosion chambers and thereafter assisting in the ejection of the ignited gases is identical for each of the explosion chambers. For each chamber it consists of a piston 54 forming the top of the explosion chamber and slidably mounted in a slightly enlarged portion or bore in the body 21 so that there is a shoulder 55 against which the piston 54 may normally rest. Resilient means, in the form of a spring 56, normally acts against the piston 54 to keep it on its seat. The tension of these springs may be adjusted for properly tuning the power unit. Each spring 56 has its upper end mounted on a member 57 which is supported by a screw 58 threadedly engaging through the top wall of the body 21. This screw may be turned to extend further downwards, or be retracted upwards, and so control the pressure of the spring 56.

A lock nut 59 is engaged on each screw 58 by which it may be locked in adjusted positions. Besides controlling the resiliency of each of the pistons 54 by the use of springs, such as the springs 56, an air cushion arrangement is also used. Each piston 54 slides in a chamber 60 in the body 21. These chambers are closed chambers. Each chamber is provided with a one-way air valve 61 through which air may be forced into the chamber or allowed to escape from the chamber, if desired. Each chamber 60 is provided with a pressure gauge 62. It is possible to vary the pressure of the air within the chamber 60 so as to control the resiliency or cushioning effect of each piston 54.

The disc 42 is suitably packed to prevent leakage around its periphery. Along its top peripheral portions there are flanges or shoulder portions 63 and 64. The engagement of these shoulder portions against the edge portions of the disc 42 are adjustable and controllable by the provision of a plurality of shims 65 which are interposed between the bottom edge of the body 21 and an annular member 21a secured to the body 21 by bolts or screws 66.

To tighten up a leak it would merely be necessary that the screws 66 be removed, that the annular member 21a be removed, that some of the shims 65 be removed; and then the annular member 21a and the bolts 66 replaced. The power unit body 21 is also provided with a water cooling jacket 20a. The power unit may be cooled in any other manner.

The operation of the device is as follows:

The engine is started in any conventional manner, such as by priming, cranking, or the like. The fan 33 will draw in the gas mixture into the induction chamber 32 through the carburetor line 23. The fan 33 will then pack and compress the gas mixture into the packing and compressing chamber 35. The fan 33 is driven by the shaft 40 which obtains its rotation directly from the disc 42. The disc 42 is turned by the passageway tube 29, which in turn is turned by the drive system which includes the gear 24', 25', etc., to the crank shaft of the engine.

Figures 13A, 13B, 13C, 13D:
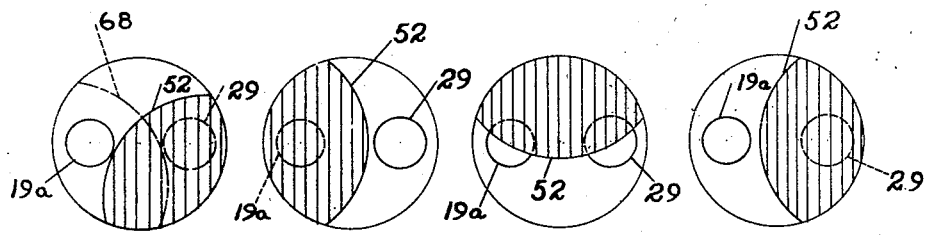
Figs. 13a, 13b, 13c and 13d are schematic illustrations to show the different positions of the shutter valve at the top of the cylinder when the piston of the cylinder is at various positions.

The distributor cup 36 which is attached to the shaft 40 will turn along with the shaft and will reach a position in which its port 37 is aligned with the port 38 of one of the explosion chambers 35. The gas mixture will then be forced into the chamber 35. At the proper time the disc 42 will have turned to a position in which the tube 29 is aligned with the particular explosion chamber 35 into which the gas has just passed. The ignition system which includes the contacts 45, the wiper contact 47, and the spark plug 39 will go into operation and ignite the gas mixture. The expanding gas will force the piston 54 upwards through a short distance depending on the cushioning effect of the spring 56 and the air within the chamber 60. After the initial impact of the igniting gas the piston 54 will come down to its initial position on its seat 55 and will assist in forcing the ignited gases from the ignition chamber 35 through the tube 29 and against the top of the piston 17'. The shutter 52 will act in synchronization with the other parts of the device. The timing of the shutter may be understood from an inspection of Figs. 13a, 13b, 13c and 13d as follows:

In Fig. 13a the position of the shutter illustrates its position when the piston 17' is at the extreme top, as shown in Fig. 7. In this position of the shutter 52 the passageway tube 29 is closed and the exhaust port 19a is open. The piston 17' has just forced out all the exhaust gas. The piston 17' now starts traveling downwards and after it has been moved a very short distance, sufficient for the shutter 52 to assume the dot and dash line position indicated by reference numeral 68, the exhaust port 19a will be closed and the passageway tube 29 will be opened. It is at this instant that the ignition of the gas takes place, and then the expanding gas strikes down like a hammer blow on the top of the piston 17', delivering its power and forcing the piston downwards. When the piston has reached its half way downward position the shutter 52 will have reached the position shown in position of Fig. 13b. When the piston 17' has reached its extreme downward position the shutter 52 will be in the state shown in position of Fig. 13c.

It should be noted that now the passageway tube 29 is being closed and the port 19a is being opened. The piston now is traveling upwards and when it reaches the half way upward position the shutter will be in the state shown in position of Fig. 13d. It should be noted that the passageway tube 29 is still closed and the burned gases are being exhausted through the port 19a. When the piston reaches its top position the shutter will be in the state shown in position of Fig. 13a.

During a complete cycle of the piston 17' the passageway tube 29 will have been rotated ⅓ of a revolution. It is pointed out that the shutter 52 travels much faster than the passageway tube 29 because of the increase in speed from the gear 51 to the gear 50. In this way the passageway tube 29 travels to each of the explosion chambers of the cluster of chambers in a regular sequence. For each complete revolution of the piston 17' a different explosion chamber 35 will be in operation, depending upon the position of the passageway tube 29, until all of the explosion chambers of the cluster of explosion chambers have been given a chance to operate. Duplication of the cycle then takes place.

It should be noted that the main cylinder 15' necessarily must be lower in temperature than it would be if explosions took place within its top portion as is now the practice in internal combustion engines. It should further be noted that since the explosion chambers 35 are not continuously used but rather in rotation, they have an opportunity to cool. Therefore, the temperature of each explosion chamber will be much lower than if only one explosion chamber were used. Furthermore, the radiating surfaces of the cluster of explosion chambers are much greater than the radiating surface of a single explosion chamber.

For a cylinder of a given length, the power of the engine will be increased because the piston 17' may travel through a greater stroke. It is no longer necessary that there be a compression space for the gases within the top portion of the cylinder 15'. The elimination of this area increases the possible horse power of the engine.

Another feature obtained by this invention is the lack of resistance of exhaust gases from the top of the cylinder 15' during the exhaust stroke of the piston 17'.

In Fig. 14 a modification of the invention is disclosed. This modification relates to a step-up in the speed of the rotation of the fan 33, if this is desirable. According to this form, the fan 33 also separates the induction chamber 32 from the packing of the compression chamber 34 and is for the same purpose as described in the previous form of the invention. The fan 33 is mounted on a shaft 40a which is rotatively supported in a bearing 70 comprising the hub portion of an annular spoked member 71 which is secured by screws 72 within the chamber 34. The shaft 40a is merely a stud shaft and on its lower end is provided with a small gear 73 which meshes with a gear 74 fixed on a shaft 75 rotatively supported in a bearing 76 supported on the annular member 71. The gear 74 meshes with a large gear 77 upon the upper end of a shaft 40b. This shaft 40b supports the distributor cup 36 and rotatively engages through the fixed disc 41. The lower portion of the shaft 40a connects with the identical parts as the shaft 40 in the prior form.

When the shaft 40b rotates it will indirectly drive the shaft 40a at an increased speed, depending upon the ratio of the gears 73, 74 and 77. In other respects this form of the invention is similar to the previous form and similar parts may be identified by corresponding reference numerals.

It should be understood that the invention has been disclosed in conjunction with certain types of engines only merely for purposes of illustration. The many types of engine constructions, sizes, and makes would require too many minor details to be included in this specification and would complicate matters beyond a comprehensible reading. Therefore, I reserve rights for such minor changes as may be deemed necessary and warranted to place this device on any internal combustion engine, reserving to cover any such accessories as may be deemed necessary to be and remain as a part of this invention, though not essential on each device or all devices, which is merely for practical uses to properly fit the attachment or power unit to the engine.

Of course, I do not wish to be limited to exact details of construction as herein shown as these may be varied within the limits of the appended claims without departing from the spirit or the scope of my invention. It should be clearly understood that the device is applicable to uses with all types of gasoline fueled engines and other internal combustion engines on general engine principles and having electrical firing equipment.

It is to be further understood that the same is susceptible of changes, modifications and improvements coming within the scope of the appended claims.

Having thus described my invention, what I claim as new and desire to secure by United States Letters Patent is:

1. In a device of the class described, a cylinder with a piston therein reciprocative by a crank, a cluster of explosion chambers for prematurely igniting and expanding gases to supply the power stroke of said piston in said cylinder and said chambers having their base ends open and in a plane, a disc rotatively mounted and forming a closure for said open base ends and having a port hole selectively alignable with said chambers during rotation of said disc, a passageway tube of substantially S-shape having one end connected with said port hole and the other end coaxial with said disc and connected with the top of said cylinder to direct partially expanded gases against said piston, means for rotating said passageway tube about its latter-mentioned end and synchronized with said crank to connect each of said chambers in rotation with the cylinder for each cycle of the piston, an exhaust from said cylinder having its inner end in a plane with the end of said passageway tube, a rotative valve disc selectively engageable over the inner end of said exhaust and the end of said passageway tube, and means for rotating said valve synchronized with said passageway tube and engageable over said exhaust end and passageway tube end for each position of the passageway tube as the latter selectively connects with said chambers.

2. In a device of the class described, a cylinder with a piston therein reciprocative by a crank, a cluster of explosion chambers for prematurely igniting and expanding gases to supply the power stroke of said piston in said cylinder and said chambers having their base ends open and in a plane, a disc rotatively mounted and forming a closure for said open base ends and having a port hole selectively alignable with said chambers during rotation of said disc, a passageway tube of substantially S-shape having one end connected with said port hole and the other end coaxial with said disc and connected with the top of said cylinder to direct partially expanded gases against said piston, means for rotating said passageway tube about its latter-mentioned end and synchronized with said crank to connect each of said chambers in rotation with the cylinder for each cycle of the piston, an exhaust from said cylinder having its inner end in a plane with the end of said passageway tube, a rotative valve disc selectively engageable over the inner end of said exhaust and the end of said passageway tube, means for rotating said valve synchronized with said passageway tube and engageable over said exhaust end and passageway tube end for each position of the passageway tube as the latter selectively connects with said chambers, a body portion connecting together the base ends of said chambers, an annular member secured to said body portion, and said disc being rotatively mounted between said body portion and said annular member.

3. In a device of the class described, a cylinder with a piston therein reciprocative by a crank, a cluster of explosion chambers for prematurely igniting and expanding gases to supply the power stroke of said piston in said cylinder and said chambers having their base ends open and in a plane, a disc rotatively mounted and forming a closure for said open base ends and having a port hole selectively alignable with said chambers during rotation of said disc, a passageway tube of substantially S-shape having one end connected with said port hole and the other end coaxial with said disc and connected with the top of said cylinder to direct partially expanded gases against said piston, means for rotating said passageway tube about its latter-mentioned end and synchronized with said crank to connect each of said chambers in rotation with the cylinder for each cycle of the piston, an exhaust from said cylinder having its inner end in a plane with the end of said passageway tube, a rotative valve disc selectively engageable over the inner end of said exhaust and the end of said passageway tube, means for rotating said valve synchronized with said passageway tube and engageable over said exhaust end and passageway tube end for each position of the passageway tube as the latter selectively connects with said chambers, a body portion connecting together the base ends of said chambers, an annular member secured to said body portion, and said disc being rotatively mounted between said body portion and said annular member, and shims interposed between said annular member and body portion for packing these parts to prevent leakage of the prematurely expanded gases.

4. In a device of the class described, a cylinder with a piston therein reciprocative by a crank, a cluster of explosion chambers for prematurely igniting and expanding gases to supply the power stroke of said piston in said cylinder and said chambers having their base ends open and in a plane, a disc rotatively mounted and forming a closure for said open base ends and having a port hole selectively alignable with said chambers during rotation of said disc, a passageway tube of substantially S-shape having one end connected with said port hole and the other end coaxial with said disc and connected with the top of said cylinder to direct partially expanded gases against said piston, means for rotating said passageway tube about its latter-mentioned end and synchronized with said crank to connect each of said chambers in rotation with the cylinder for each cycle of the piston, an exhaust from said cylinder having its inner end in a plane with the end of said passageway tube, a rotative valve disc selectively engageable over the inner end of said exhaust and the end of said passageway tube, and means for rotating said valve synchronized with said passageway tube and engageable over said exhaust end and passageway tube end for each position of the passageway tube as the latter selectively connects with said chambers, said passageway tube of substantially S-shape being also of frusto-conical shape to permit expansion of the bases during passage therethrough.

5. In a device of the class described, a cylinder with a piston therein reciprocative by a crank, a cluster of explosion chambers for prematurely igniting and expanding gases to supply the power stroke of said piston in said cylinder and said chambers having their base ends open and in a plane, a disc rotatively mounted and forming a closure for said open base ends and having a port hole selectively alignable with said chambers during rotation of said disc, a passageway tube of substantially S-shape having one end connected with said port hole and the other end coaxial with said disc and connected with the top of said cylinder to direct partially expanded gases against said piston, means for rotating said passageway tube about its latter-mentioned end and synchronized with said crank to connect each of said chambers in rotation with the cylinder for each cycle of the piston, an exhaust from said cylinder having its inner end in a plane with the end of said passageway tube, a rotative valve disc selectively engageable over the inner end of said exhaust and the end of said passageway tube, and means for rotating said valve synchronized with said passageway tube and engageable over said exhaust end and passageway tube end for each position of the passageway tube as the latter selectively connects with said chambers, said means for rotating said passageway tube including a ring gear mounted about said tube coaxial with the axis of rotation thereof, and a transmission system connected with said ring gear and with said crank.

6. In a device of the class described, a cylinder with a piston therein reciprocative by a crank, a cluster of explosion chambers for prematurely igniting and expanding gases to supply the power stroke of said piston in said cylinder and said chambers having their base ends open and in a plane, a disc rotatively mounted and forming a closure for said open base ends and having a port hole selectively alignable with said chambers during rotation of said disc, a passageway tube of substantially S-shape having one end connected with said port hole and the other end coaxial with said disc and connected with the top of said cylinder to direct partially expanded gases against said piston, means for rotating said passageway tube about its latter-mentioned end and synchronized with said crank to connect each of said chambers in rotation with the cylinder for each cycle of the piston, an exhaust from said cylinder having its inner end in a plane with the end of said passageway tube, a rotative valve disc selectively engageable over the inner end of said exhaust and the end of said passageway tube, and means for rotating said valve synchronized with said passageway tube and engageable over said exhaust end and passageway tube end for each position of the passageway tube as the latter selectively connects with said chambers, comprising a ring gear mounted on said passageway tube coaxial with the axis of rotation thereof, a pinion meshing with said ring gear and rotatively supported, and said valve disc being fixedly mounted on said pinion to rotate therewith.

LYNN J. KOCH.